UNITED STATES PATENT OFFICE.

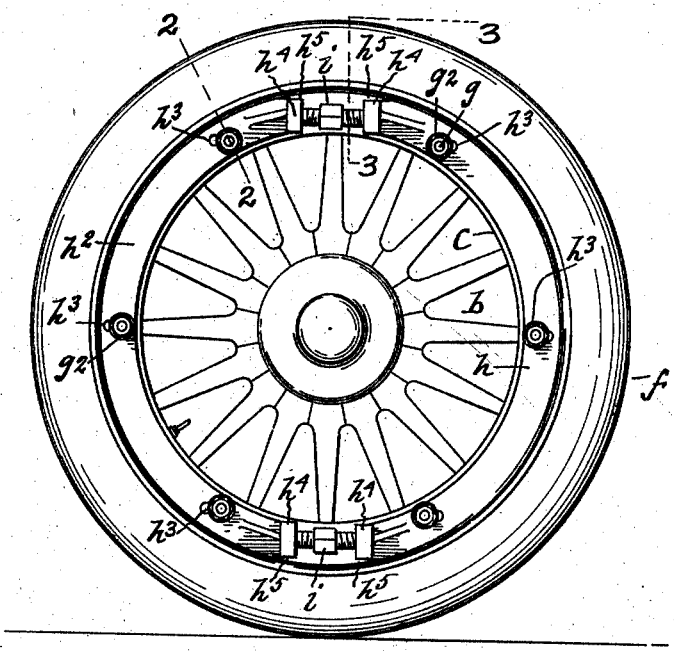

GEORGE W. CLEMENTS, OF DETROIT, MICHIGAN.

TIRE ATTACHMENT.

1,315,009.   Specification of Letters Patent.   Patented Sept. 2, 1919.

Application filed December 18, 1918. Serial No. 267,296.

*To all whom it may concern:*

Be it known that I, GEORGE W. CLEMENTS, a citizen of the United States, residing at Detroit, county of Wayne, State of Michigan, have invented a certain new and useful Improvement in Tire Attachments, and declare the following to be a full, clear, and exact description of the same, such as will enable others skilled in the art to which it pertains to make and use the same, reference being had to the accompanying drawings, which form a part of this specification.

My invention relates to means for securing rims of automobile wheels and consists in the improvements hereinafter described and pointed out in the claims.

In the accompanying drawing:

Figure 1 is an elevation of an automobile wheel, the rim being secured in place by an apparatus embodying my invention.

Fig. 2 is a detail sectional view on the line 2—2 Fig. 1.

Fig. 3 is a detail sectional view on the line 3—3 Fig. 1.

Fig. 4 is a detail plan view, and

Fig. 5 is a sectional view of a modified construction of the turn-buckle shown in Fig. 4.

$a$ is a hub, $b$ the spokes, $c$ the felly and $d$ the felly band of a vehicle wheel. $d^2$ is an annular flange around the inner edge of the felly band $d$. $f$ is the tire and $e$ the grooved band or rim of the usual construction carrying the tire $f$ between its two lateral annular flanges and adapted to fit over the felly band $d$ in the usual way. $g$ indicates the attaching bolts extending through the felly, provided with heads upon one side of the same and with screw threads, and engaging nuts, upon the other side.

The above is the usual conventional construction.

I provide two arcuate strips $h$ and $h^2$ each extending for nearly a semi-circle and having outwardly extending lugs $h^4$ upon their ends. $i$ $i$ are screw-threaded bolts each engaging by right and left threads with its opposite ends in screw threaded apertures in a pair of adjacent lugs $h^4$ $h^4$. The bolts $i$ are provided with a square portion at their center and screw threaded for the rest of their lengths, the construction forming what is usually called a turn-buckle. $h^3$ indicates slots formed through the arcuate strips $h$ $h^2$ extending parallel to the bolts $i$ $i$ and engaging the bolts $g$ whereon the strips are held by the nuts $g^2$. The strips $h$ $h^2$ are formed in the arc of a circle whose radius is approximately the radius of the wheel. The strips $h$ $h^2$ for the larger portion of their inner surface lie flat against the felly but at their outer edge turn outward as shown at $h^6$ in Fig. 2, so as to present a shelving surface to engage the tire rim $e$ along its outer edge. Each of the strips $h$ $h^2$ is cut away as shown at $h^5$ at its ends and outer edge in a way and for a purpose hereinafter described.

The method of using and the operation of the above described device is as follows:

The strips are placed as shown in Fig. 1 with the bolts $g$ extending through the slots $h^3$ and the turn-buckle and bolts $i$ $i$ engaging their respective pairs of lugs. The bolts $i$ have been so adjusted as to draw the parts $h$ $h^2$ toward each other until their outer edges come below the inner edge of the tire rim $e$ mounted upon the felly band of the wheel. The bolts $i$ $i$ are turned so as to force the strips $h$ $h^2$ away from each other and force their shelving edges $h^6$ outward along the outer edge of the tire rim $e$ thus forcing said rim against the flange $d$ of the felly band and securing the tire rim firmly upon the wheel. If the nuts $g^2$ upon the bolts $g$ are loosened to permit of the above described operation they are now screwed up securing the strips $h$ $h^2$ firmly in place and holding the tire securely upon the wheel. It is seldom necessary to actuate the nuts.

It will be observed that the above described device can be used with wheels of the usual construction. The engaging clips that are usually used being dispensed with.

The strips $h$ $h^2$ are cut away, as shown at $h^5$, so that they shall clear the tire band $e$ when said strips are drawn toward each other to disengage, and permit the removal of the tire.

It is obvious that the minor details of the structure may be modified without departing from my invention. Its essential features are the use of two semi-circular members, engaging the detachable rim which carries the tire, and means for obviating the difficulty inherent in the use of such semi-circular members, and means for spreading the same so as to engage the rim, and to entirely withdraw the semi-circular members from the rim by collapsing them, substantially as described.

What I claim is:

1. The combination of a wheel having a removable tire rim thereon, securing bolts extending laterally from said wheel, arcuate strips having parallel slots therethrough, said strips engaging against the side of said wheel with said bolts extending through said slots, and means for drawing said strips toward each other or forcing the same apart, said slots being adapted to guide and permit the motion of said strips for the purpose described.

2. The combination of a wheel, a tire rim thereon, arcuate strips engaging against the side of said wheel at its periphery, each of said strips extending for approximately a semi-circle, said strips being cut away at their ends and outer edges, means for forcing said strips apart or drawing them together, and means for securing said strips and means for guiding each of the same in a motion of translation parallel to a radius of the wheel, said strips being adapted to engage said tire band for the purpose described when forced apart.

In testimony whereof I sign this specification.

GEORGE W. CLEMENTS.

Copies of this patent may be obtained for five cents each, by addressing the "Commissioner of Patents, Washington, D. C."